United States Patent [19]
Nix

[11] Patent Number: 5,811,789
[45] Date of Patent: Sep. 22, 1998

[54] FOCUSING METHOD FOR OPTICAL MEDIA

[75] Inventor: Tim Nix, Olyphant, Pa.

[73] Assignee: WEA Manufacturing, Inc., Olyphant, Pa.

[21] Appl. No.: 862,443

[22] Filed: May 23, 1997

Related U.S. Application Data

[60] Provisional application No. 60/030,287 May 24, 1996.

[51] Int. Cl.⁶ ..................................................... G01J 1/20
[52] U.S. Cl. .................................... 250/201.2; 250/201.5; 369/44.14
[58] Field of Search .............................. 250/201.2, 201.5, 250/201.4; 369/44.14, 44.11, 44.25, 44.26, 54

[56] References Cited

U.S. PATENT DOCUMENTS 4,750,163  6/1988  Yamamiya et al. ........................ 369/54

*Primary Examiner*—Que Le
*Attorney, Agent, or Firm*—Gottlieb, Rackman & Reisman, P.C.

[57] ABSTRACT

A method for focusing the objective of an optical pick-up head on the desired information layer of an optical memory device. The focus error signal when the focus servo is in open loop mode is used to determine the location of the information layers (or layer) and to provide a mechanism for providing a signal which can be used to time/trigger the closing of the focus servo, thus providing focus on the desired layer. One example of an embodiment of the invention is an application to a dual layer optical disc.

4 Claims, 3 Drawing Sheets

FOCUSING METHOD FOR OPTICAL MEDIA

FIELD OF THE INVENTION

This invention relates to methods for reading data from an optical storage medium such as a compact disc In particular it relates to a method for focusing the objective of an optical pick-up head when more than one information layer is present on the optical storage medium.

BACKGROUND OF THE INVENTION

Compact discs are typically composite objects having a series of pits impressed into a plastic surface, usually during an injection molding process. These pits and the lands between them are arranged in a spiral pattern that can be tracked by a pickup laser beam which advances slowly along a radius of the disc while the disc is spun about an axis through the center of the disc. The pit/land surface is coated with a thin reflective metal layer. The pickup laser beam is reflected from the metal layer coating the pits and lands and the reflection is analyzed to observe the change in reflection intensity associated with a transition from a land to a pit or vice versa. To enhance the change in reflection intensity the wavelength of light is chosen to cause interference when the laser illuminates a pit. The interference occurs between laser light reflected from the bottom of a pit and light reflected from the areas outside the pits struck by the laser light. Therefore the wavelength of light is not chosen arbitrarily, but is typically related to the depth of the pits. An infrared wavelength of 780–790 nm in air (503–510 nm in polycarbonate where the index of refraction n=1.55) is often used. By detecting the change in reflection intensity, the length of the pit and or land as it passes under the pickup laser is sensed by photocells and is then interpreted by the CD player's electronics. Data is encoded onto the compact disc as varying lengths of the pits and lands. The data may be analog or digital data. For example a voltage level may correspond to a pit length in an analogue recording, or the length of the pits/lands may represent strings of 0's or 1's for the recording of digital data.

The amount of data that can be encoded onto a disc is limited by the density of pits and lands that can be accurately reproduced, for example by an injection molding procedure, and that can be accurately read by a photocell sensor system. Some error rate can be tolerated if the data is placed on the disc in a redundant format that allows errors to be recognized and corrected. Thus as the pits and lands are decreased in size it becomes necessary as a practical matter to provide greater redundancy in the data until a limit is reached in the amount of data that can be stored on the disc surface.

Optical media have been proposed in which there are two surfaces of data both of which can be read from a single side of the media. This has been proposed in the form of a compact disc having two data bearing surfaces. This is obtained by putting a semi-transmissive coating on the top of the bottom layer of the compact disc in its usual orientation (read from below) and using an optically clear adhesive to glue both sides together. The top side is then coated with a normal amount of aluminum. It then becomes a problem to have the optical pickup or reading head select (i.e. focus upon) the proper layer of data in a predictable and reliable manner.

The optical pickup in a standard compact disc system is required to provide a vertical accuracy of 2 micrometers while the surface of the disc may deviate from planarity by as much as 600 micrometers. This requires the optical pickup's objective to refocus as the disc rotates beneath it. This is accomplished by a servo-driven auto-focus system utilizing control electronics and a servo motor that locates the objective lens in its motion towards or away from the disc surface. Different techniques are known, namely use of an astigmatic cylindrical lens, use of a knife edge and Foucault focusing and critical angle focusing.

One auto-focus system that will be described relies upon an astigmatic cylindrical lens. This lens is placed in the path of light reflected from the data bearing surface before it reaches a photodiode array. When the data surface lies precisely at the focal point of the objective lens of the pickup device the image reaching the photodiode array is unaffected by the astigmatism of the cylindrical lens. A circular spot strikes the center of the photodiode. When the objective is out of focus an elliptical pattern strikes the photodiode array. The orientation of the major axis of the ellipse indicates whether the objective is too close or too far from the data surface.

The photodiode array may comprise light sensitive quadrants, i.e. a rectangular array of four light detection regions. By combining the electrical signals returned from these quadrants a focus error signal is generated. This signal is typically formed by first forming two signals indicative of the sum of the signals from opposite diagonals of the photodiode array and then forming a signal representative of the difference between these two signals. This focus error signal is then interpreted and used to drive the servo that controls the motion of the pickup head.

In an alternative system a wedge lens is used in place of the astigmatic lens. The wedge lens splits the returning beam into two beams. A linear photodiode array of four components receives the returning light. When there is proper focus the light falls between the array elements. The light strikes the central two components when the pickup head is too close to the data surface and strikes the outer two components when the pickup head is too far from the data surface. A focus error signal is formed from the difference between the sum of signals from the two terminal and the two central array elements.

The focus error signal is used in a closed loop circuit to provide information to drive the servo motor to maintain focus. Where there is more than one data surface the focus error signal does not distinguish which of the two or more data layers are being read. It is an object of the present invention to provide a method for selectively focusing a pickup head on a desired data layer of an optical medium having multiple layers.

BRIEF DESCRIPTION OF THE INVENTION

This invention describes a method for focusing the objective of an optical pick-up head on the desired information layer of an optical memory device. When the objective lens of an optical pick-up head is displaced vertically with respect to the reference plane of an information layer a focus error signal is generated. This focus error signal is used in the closed loop servo mode to maintain proper focus during data recovery from the optical memory device.

The basic principle of this invention is to use the focus error signal when the focus servo is in open loop mode to determine the location of the information layers (or layer) and to provide a mechanism for providing a signal which can be used to time/trigger the closing of the focus servo, thus providing focus on the desired layer. One example of an embodiment of the invention is an application to a dual layer optical disc.

DETAILED DESCRIPTION OF PREFERRED EMBODIMENTS

Figure 1:
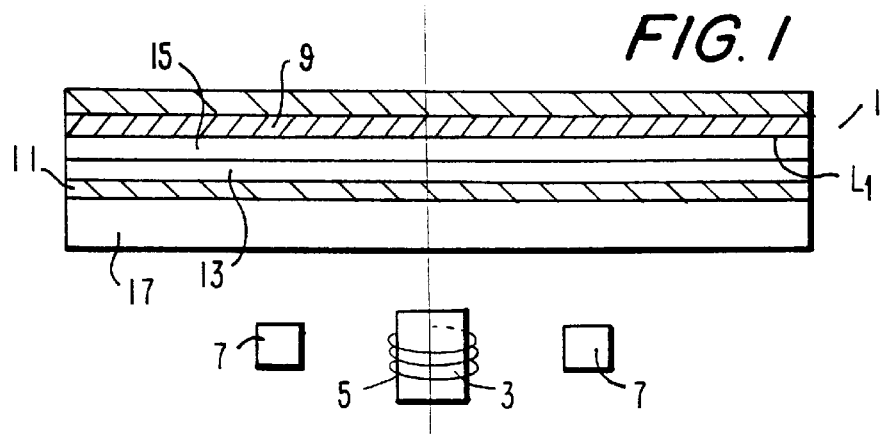
FIG. 1 is a cross section showing an optical disc having two data surfaces and the pickup head that reads the data from the disc.

FIG. 1 shows a dual data surfaced compact disc 1 having two layers of data bearing pits and lands indicated as L0 and L1. The pickup head 3 is located below the disc and receives laser light returned by reflection from the surfaces L0 and L1. The pickup head 3 is driven by a servo mechanism which may comprise nothing more than a coil that receives a current which causes the pickup head to move in an external magnetic field of magnets 7.

The compact disc 1 thus comprises the two data surfaces L0 and L1 each backed by a reflective layer. In the case of layer L1, the reflective layer 9 may be opaque. In the case of layer L0, the reflective layer 11 is semi-transparent. This may be achieved by using a thin metallic film. In this manner light may reach both data layers from the same side of the disc. During fabrication the two data layers would be formed separately and bonded by a transparent adhesive layer 13. The data layers are typically formed in a polycarbide vinyl (PCV) material 15, 17.

Figure 2:
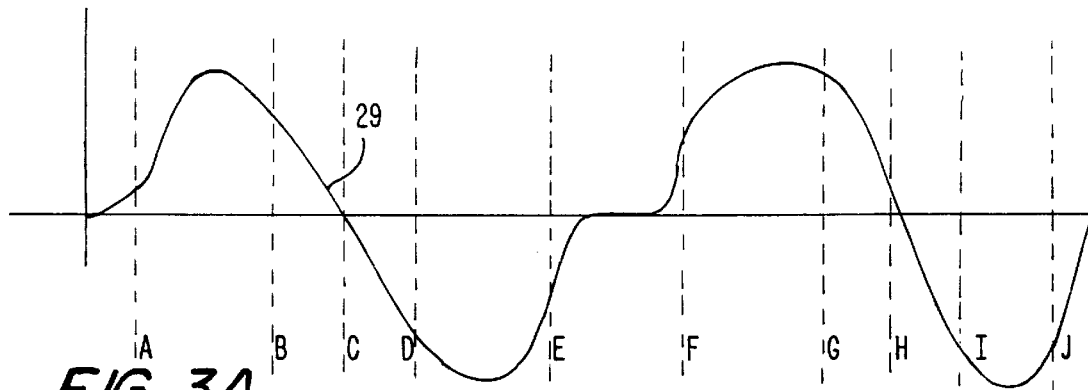
FIG. 2 is a graph of the focus error signal as a function of displacement of the objective lens of the pickup head.

FIG. 2 shows the focus error signal generated as the pickup head is displaced. The x axis depicts the position of the lens in the pickup head. The x direction corresponds to the vertical axis through the pickup head in FIG. 1.

Lens position C is focus on Layer Zero (L0). Lens position H is focus on Layer One (L1). Points to the left of C are below L0. Points to the right of C and to the left of H are between L0 and L1. Points to the right of H are above L1.

The term "close" is used to refer to a distance from a surface such that if the focus servo loop is closed focus will be acquired on the desired layer. Points between B and D are close to the L0 focus. Points between G and I are close to the L1 focus.

Figure 4:
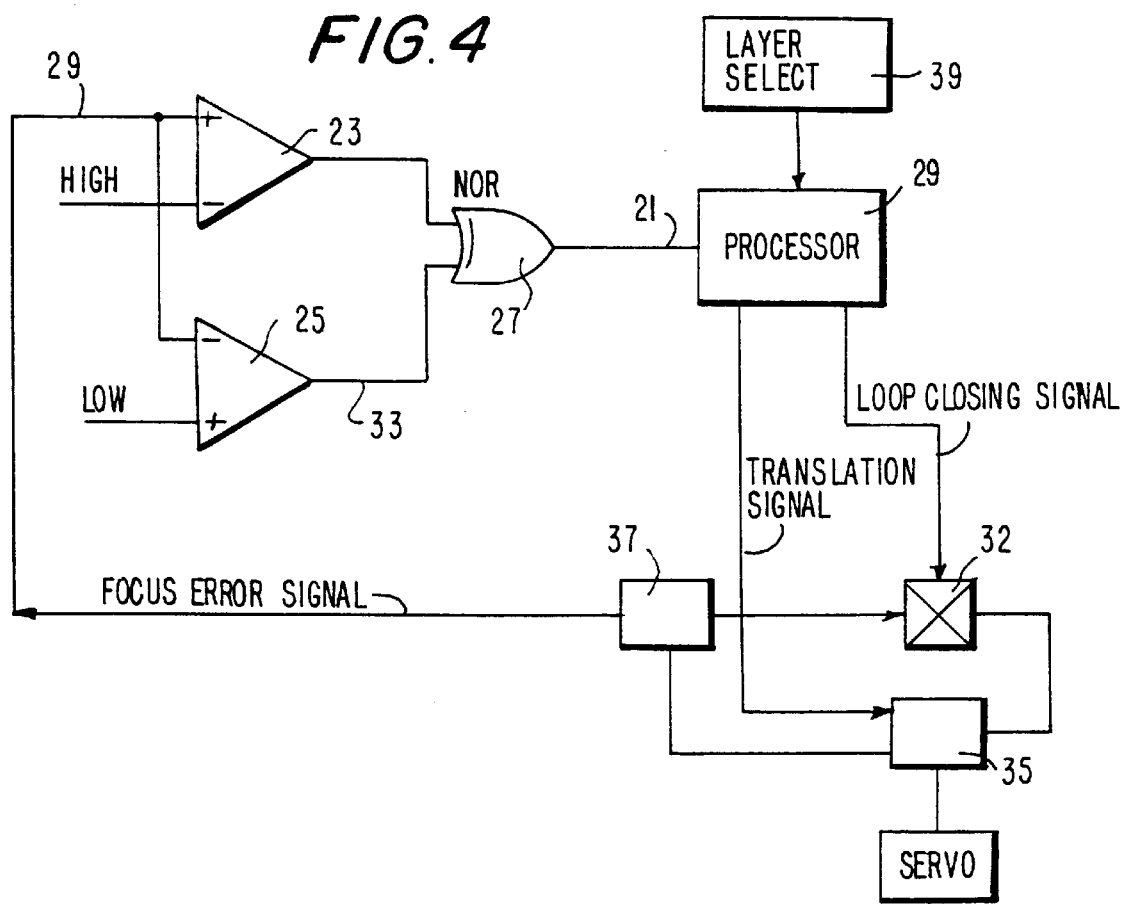
FIG. 4 is a logic diagram for the comparators and gates of the invention.
Figure 3A:
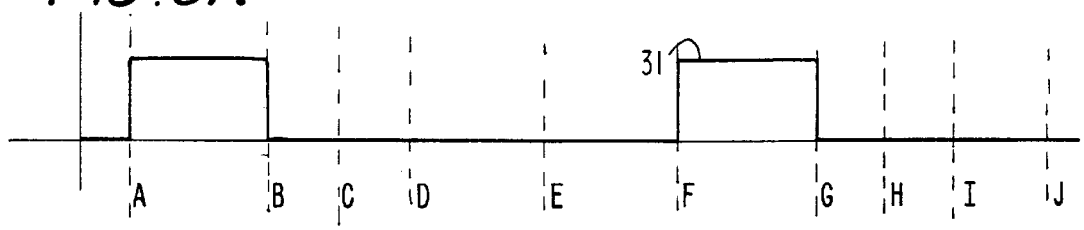
FIG. 3A is a graph of the output of a positive comparator of the focus error signal and a specified high value.
Figure 3B:
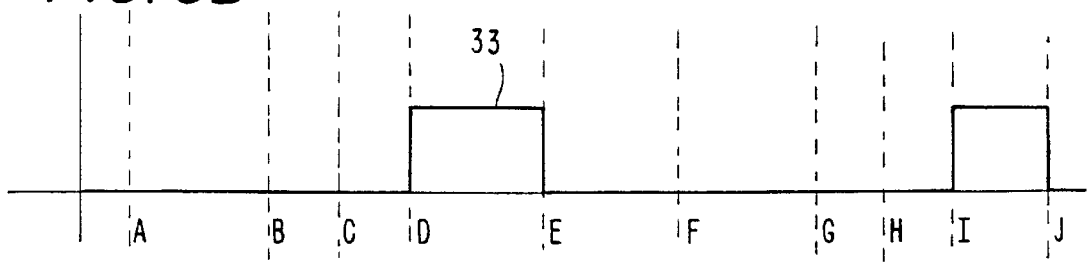
FIG. 3B is a graph of the output of a negative comparator of the focus error signal and a specified low value.
Figure 3C:
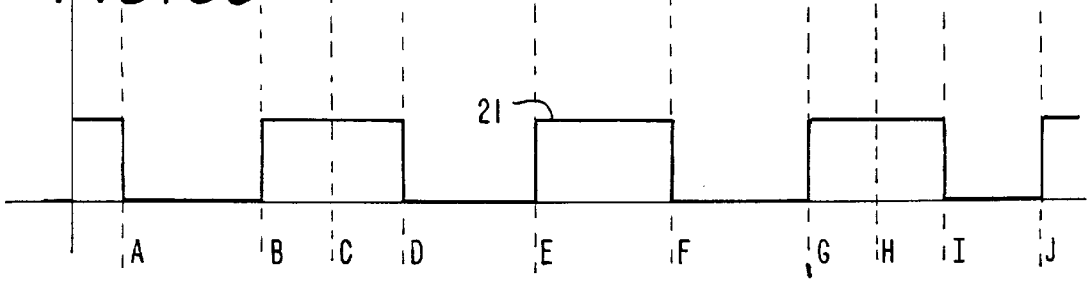
FIG. 3C is a graph of the logic signal formed from NOR gate output having as input the signals of FIGS. 3A and 3B.

As shown in FIG. 4 a digital control signal 21, depicted in FIG. 3C as a function of x, is generated from two comparator circuits 23, 25 and a NOR gate. The digital control signal comprises a series of digital control pulses. Referring further to FIG. 4, the input 29 to the comparators is the Focus Error Signal (FE). The Positive Comparator 23 has its threshold set so that the output is high when FE is more positive than a specified value. The Negative Comparator 25 threshold is set so that its output is high when FE is more negative than a specified value. The inputs 31, 33 to the NOR gate are the outputs of the two comparators 23, 25.

If the lens 3 is translated, the NOR output 21 gives an indication of lens position with respect to the information layers L0 and L1. If the lens is translated at known velocities the X-axis becomes a time reference. In this case, the NOR output provides a signal to a processor 29 that can be used to trigger the closing of the focus servo loop gate 32, resulting in closing of the servo loop 33 and the disengagement of the lens translation function. The processor 29 may also provide translation (i.e. axial movement) commands to a servo controller 35. With the loop gate 32 closed, the pickup head controller 37 provides focus error signals to the servo controller 35 as well as to comparators 23 and 25. The processor 29 also receives instructions from layer selection register 39 whenever it is necessary for the pickup head to read from a particular layer.

Figure 5:
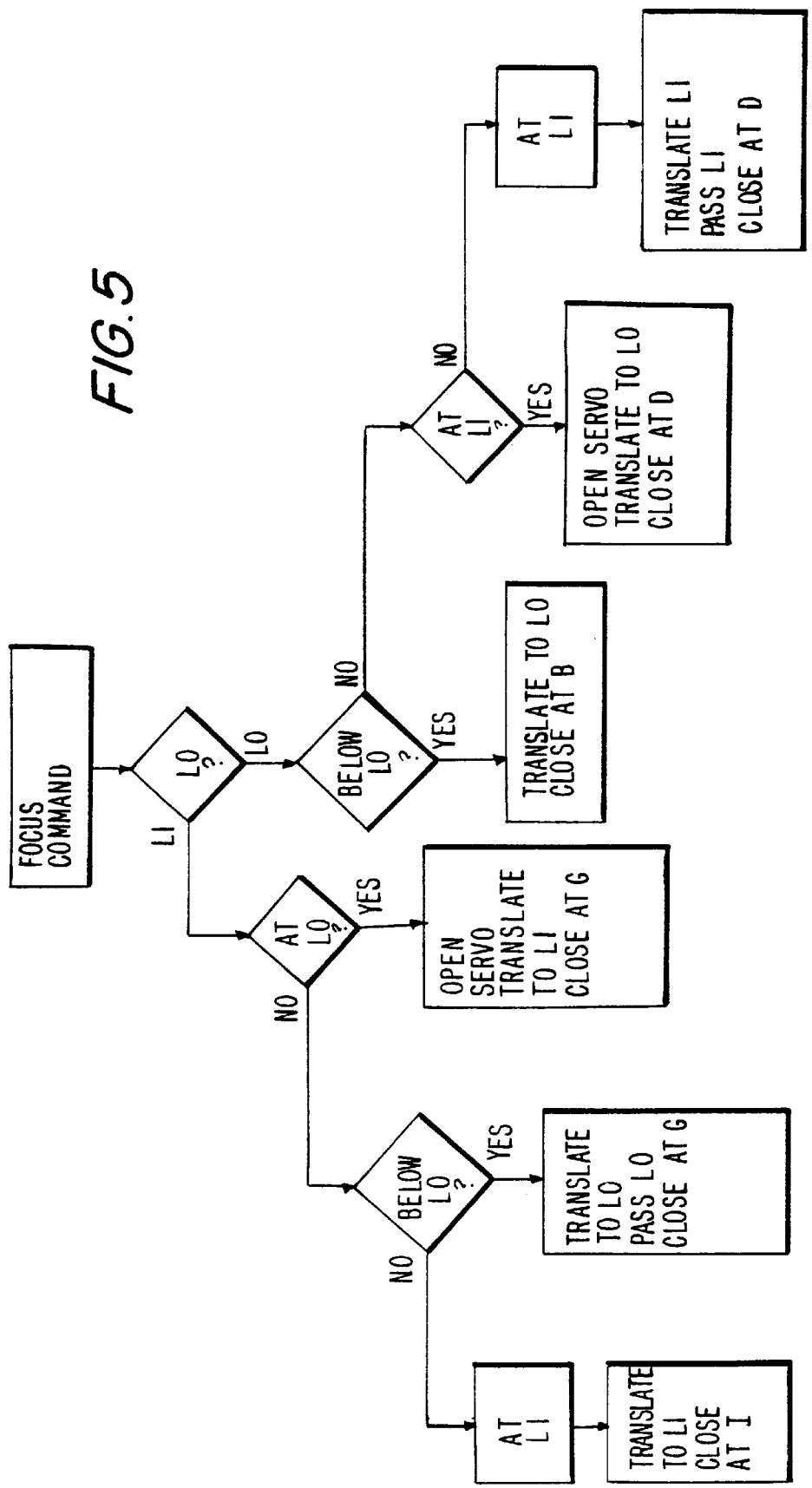
FIG. 5 is a flow diagram of the steps needed to jump from any position to any data layer.

To focus upon the two data surfaces with accuracy six cases have to be considered. These are charted in FIG. 5 for clarity.

Case 1—To focus on L0 from a position below L0
 a) Translate the lens toward L0
 b) Switch focus servo to closed loop and disengage lens translation at point B.

Case 2—To focus on L1 from a position at focus on L0
 a) Open focus servo
 b) Translate the lens toward L1
 c) Switch focus servo to closed loop and disengage lens translation at point G Case 3—To focus on L0 from a position at focus on L1
 a) Open focus servo
 b) Translate the lens toward L0
 c) Switch focus servo to closed loop and disengage lens translation at point D Case 4—To focus on L1 from a position at focus below L0
 a) Translate the lens toward L0
 b) Continue translation past L0
 c) Switch focus servo to closed loop and disengage lens translation at point G Case 5—To focus on L1 from a position at focus above L1.
 a) Translate the lens toward L1
 b) Switch focus servo to closed loop and disengage lens translation at point I Case 6—To focus on L0 from a position at focus above L1.
 a) Translate the lens toward L1
 b) Continue translation past L1
 c) Switch focus servo to closed loop and disengage lens translation at point D It should be noted that in each of the above cases, the focus error signal can be monitored and the switching can be done at the next X-axis crossing of FE after the specified position point has been passed.

The method described in this disclosure can be extended to any number of layers. Also it can be used for other types of media, for example multi-layer optical cards. Although the polarity, amplitude and dc offset of the focus error signal may vary from system to system, the basic principles of the invention can still be applied.

Although the invention has been described in terms of specific embodiments, it is intended that the patent cover equivalent substitutions for any of the elements of these embodiments, and that the protection afforded by this patent be determined by the legitimate scope of the following claims:

What is claimed is:

1. A method for reading data from an optical medium having data stored on at least two layers, said data being read through the lens of a pickup head with a focus servo, comprising the step of:

(a) receiving signals indicative of the focus error of said lens of a pickup head, (b) forming from said signals a digital control signal, comprising a series of digital control pulses, (c) moving said lens of a pickup head toward a layer selected for reading (d) placing the focus servo in an open loop mode and ceasing lens motion at the occurrence of an edge of one of said digital control pulses.

2. The method of claim 1 wherein the step of froming said series of digital focus signals comprises forming comparison signals indicative of the focus error with predetermined high and low values and forming digital focus signals corresponding to the absence of said comparison signals.

3. The method of claim 1 wherein any layer in said pickup head may be directed to read from any level in said medium.

4. A method for focusing the objective of an optical pick-up head having a focus servo on the desired information layer of an optical memory device having a plurality of data layers comprising the step of:

(a) placing the focus servo in an open loop mode (b) generate focus error signals, (c) determine the location of the information layers from the focus error signals (d) generate a signal to time or trigger the closing of the focus servo, thus providing focus on the desired layer.

\* \* \* \* \*